United States Patent [19]

Newkirk et al.

[11] Patent Number: 5,238,883
[45] Date of Patent: Aug. 24, 1993

[54] PROCESS FOR PREPARING SELF-SUPPORTING BODIES AND PRODUCTS PRODUCED THEREBY

[75] Inventors: Marc S. Newkirk; William B. Johnson, both of Newark, Del.

[73] Assignee: Lanxide Technology Company, LP, Newark, Del.

[21] Appl. No.: 551,747

[22] Filed: Jul. 12, 1990

Related U.S. Application Data

[63] Continuation-in-part of Ser. No. 446,321, Dec. 6, 1989, Pat. No. 5,010,044, which is a continuation of Ser. No. 296,773, Jan. 13, 1989, Pat. No. 4,885,131.

[51] Int. Cl.$^5$ ............................................. B22F 1/00
[52] U.S. Cl. ............................... 501/87; 501/96; 501/126; 501/102; 501/108; 501/123; 501/127; 501/132; 501/154; 148/405; 148/406; 148/407; 148/415; 148/420; 148/421; 148/422; 419/12; 419/13; 419/17; 419/57; 264/65
[58] Field of Search ................. 501/96, 87, 126, 102, 501/108, 123, 127, 132, 154; 419/12, 13, 17, 57; 25/236, 283, 244; 148/405, 406, 407, 415, 420, 421, 422; 264/65

[56] References Cited

U.S. PATENT DOCUMENTS

| | | | |
|---|---|---|---|
| 3,124,452 | 3/1964 | Kraft | 148/422 |
| 3,622,406 | 11/1971 | Vordahl | 148/421 |
| 3,758,662 | 9/1973 | Tobin | 264/332 |
| 3,864,154 | 2/1975 | Gazza et al. | 29/123 B |
| 4,471,059 | 9/1989 | Yoshino et al. | 501/96 |
| 4,492,670 | 1/1985 | Mizrah et al. | 419/12 |
| 4,544,524 | 10/1985 | Mizrah et al. | 419/12 |
| 4,585,618 | 4/1986 | Fresnel et al. | 419/12 |
| 4,595,545 | 1/1986 | Sane | 269/65 |
| 4,605,440 | 8/1986 | Halverson | 75/238 |
| 4,692,418 | 8/1987 | Boecker et al. | 501/90 |
| 4,693,989 | 9/1987 | Sane | 501/87 |
| 4,702,770 | 10/1987 | Puzik et al. | 75/236 |
| 4,718,941 | 1/1988 | Halverson | 75/236 |
| 4,793,968 | 12/1986 | Mosser et al. | 419/17 X |
| 4,834,938 | 5/1989 | Pyzik et al. | 419/6 |
| 4,885,130 | 12/1989 | Claar et al. | 419/12 |
| 4,885,131 | 12/1989 | Newkirk | 75/236 |
| 4,891,338 | 1/1990 | Gesing et al. | 501/87 |
| 4,915,736 | 4/1990 | Claar et al. | 75/238 |
| 4,916,113 | 4/1990 | Newkirk et al. | 501/89 |
| 4,940,679 | 7/1990 | Claar et al. | 501/96 |
| 5,004,714 | 4/1991 | Claar et al. | 501/134 |
| 5,010,044 | 4/1991 | Newkirk | 501/93 |
| 5,017,334 | 5/1991 | Claar et al. | 419/12 |
| 5,019,539 | 5/1991 | Claar et al. | 501/87 |
| 5,066,622 | 11/1991 | Claar et al. | 501/87 |

FOREIGN PATENT DOCUMENTS

| | | |
|---|---|---|
| 0165707 | 12/1985 | European Pat. Off. . |
| 0193292 | 9/1986 | European Pat. Off. . |
| 0239520 | 9/1987 | European Pat. Off. . |
| 1492477 | 11/1977 | United Kingdom . |

OTHER PUBLICATIONS

Iron/Carbon Phase Diagram-p. 260 of *The Science and Engineering of Material* 1985.
*Heat Treatment, Structure and Properties of Nonfettous Alloys*, Brooks, pp. 334, 338-339, 1982.

Primary Examiner—Mark L. Bell
Assistant Examiner—C. M. Bonnar
Attorney, Agent, or Firm—Mark G. Mortenson; Jeffrey R. Ramberg

[57] ABSTRACT

Self-supporting bodies are produced by reactive infiltration of a parent metal into a boron donor material and a carbon donor material. The reactive infiltration typically results in a composite comprising a boron-containing compound, a carbon-containing compound and residual metal, if desired. The mass to be infiltrated may contain one or more inert fillers admixed with the boron donor material and carbon donor material. The relative amounts of reactants and process conditions may be altered or controlled to yield a body containing a wide ranging varying volume percentage of ceramic, metal, and porosity.

24 Claims, 2 Drawing Sheets

PROCESS FOR PREPARING SELF-SUPPORTING BODIES AND PRODUCTS PRODUCED THEREBY

CROSS-REFERENCE TO RELATED APPLICATION

This application is a continuation-in-part of allowed patent application Ser. No. 446,321, now U.S. Pat. No. 5,110,044 which is a continuation of U.S. application Ser. No. 296,773, filed Jan. 13, 1989, now U.S. Pat. No. 4,885,131, in the name of Marc S. Newkirk and entitled "Process for Preparing Self-Supporting Bodies and Products Produced Thereby". The entire contents of the above-identified Patent and patent applications are hereby expressly incorporated by reference.

FIELD OF THE INVENTION

This invention relates generally to a novel method of preparing self-supporting bodies and the novel products made thereby. In its more specific aspects, this invention relates to a method of producing self-supporting bodies comprising one or more boron-containing compounds, e.g., a boride and a boride and a carbide, by reactive infiltration of a molten parent metal into a bed or mass containing a boron donor material (i.e., a boron-containing material) and a carbon donor material (i.e., a carbon-containing material) and, optionally, one or more inert fillers, to form the body.

BACKGROUND OF THE PRESENT INVENTION

In recent years, there has been an increasing interest in the use of ceramics for structural applications historically served by metals. The impetus for this interest has been the superiority of ceramics with respect to certain properties, such as corrosion resistance, hardness, wear resistance, modulus of elasticity, and refractory capabilities when compared with metals.

However, a major limitation on the use of ceramics for such purposes is the feasibility and cost of producing the desired ceramic structures. For example, the production of ceramic boride bodies by the methods of hot pressing, reaction sintering and reaction hot pressing is well known. In the case of hot pressing, fine powder particles of the desired boride are compacted at high temperatures and pressures. Reaction hot pressing involves, for example, compacting at elevated temperatures and pressures boron or a metal boride with a suitable metal-containing powder. U.S. Pat. No. 3,937,619 to Clougherty describes the preparation of a boride body by hot pressing a mixture of powdered metal with a powdered diboride, and U.S. Pat. No. 4,512,946 to Brun describes hot pressing ceramic powder with boron and a metal hydride to form a boride composite.

However, these hot pressing methods require special handling and expensive special equipment, they are limited as to the size and shape of the ceramic part produced, and they typically involve low process productivities and high manufacturing cost.

A second major limitation on the use of ceramics for structural applications is their general lack of toughness (i.e. damage tolerance or resistance to fracture). This characteristic tends to result in sudden, easily induced, catastrophic failure of ceramics in applications involving even rather moderate tensile stresses. This lack of toughness tends to be particularly common in monolithic ceramic boride bodies.

One approach to overcome this problem has been to attempt to use ceramics in combination with metals, for example, as cermets or metal matrix composites. The objective of this approach is to obtain a combination of the best properties of the ceramic (e.g. hardness and/or stiffness) and the metal (e.g. ductility). U.S. Pat. No. 4,585,618 to Fresnel, et al., discloses a method of producing a cermet whereby a bulk reaction mixture of particulate reactants, which react to produce a sintered self-sustaining ceramic body, is reacted while in contact with a molten metal. The molten metal infiltrates at least a portion of the resulting ceramic body. Exemplary of such a reaction mixture is one containing titanium, aluminum and boron oxide (all in particulate form), which is heated while in contact with a pool of molten aluminum. The reaction mixture reacts to form titanium diboride and alumina as the ceramic phase, which is infiltrated by the molten aluminum. Thus, this method uses the aluminum in the reaction mixture principally as a reducing agent. Further, the external pool of molten aluminum is not being used as a source of precursor metal for a boride forming reaction, but rather it is being utilized as a means to fill the pores in the resulting ceramic structure. This creates cermets which are wettable and resistant to molten aluminum. These cermets are particularly useful in aluminum production cells as components which contact the molten aluminum produced but preferably remain out of contact with the molten cryolite. There is further no employment of boron carbide in this process.

European Application 0,113,249 to Reeve, et al. discloses a method for making a cermet by first forming in situ dispersed particles of a ceramic phase in a molten metal phase, and then maintaining this molten condition for a time sufficient to effect formation of an intergrown ceramic network. Formation of the ceramic phase is illustrated by reacting a titanium salt with a boron salt in a molten metal such as aluminum. A ceramic boride is developed in situ and becomes an intergrown network. There is, however, no infiltration, and further the boride is formed as a precipitate in the molten metal. Both examples in the application expressly state that no grains were formed of $TiAl_3$, $AlB_2$, or $AlB_{12}$, but rather $TiB_2$ is formed demonstrating the fact that the aluminum is not the metal precursor to the boride. There is further no suggestion of using boron carbide as a precursor material in the process.

U.S. Pat. No. 3,864,154 to Gazza, et al. discloses a ceramic-metal system produced by infiltration. An $AlB_{12}$ compact was impregnated with molten aluminum under vacuum to yield a system of these components. Other materials prepared included $SiB_6$-Al, B-Al; $B_4C$-Al/Si; and $AlB_{12}$-B-Al. There is no suggestion whatsoever of a reaction, and no suggestion of making composites involving a reaction with the infiltrating metal nor of any reaction product embedding an inert filler or being part of a composite.

U.S. Pat. No. 4,605,440 to Halverson, et al., discloses that in order to obtain $B_4C$-Al composites, a $B_4C$-Al compact (formed by cold pressing a homogeneous mixture of $B_4C$ and Al powders) is subjected to sintering in either a vacuum or an argon atmosphere. There is no infiltration of molten metal from a pool or body of molten precursor metal into a preform. Further, there is no mention of a reaction product embedding an inert filler in order to obtain composites utilizing the favorable properties of the filler.

While these concepts for producing cermet materials have in some cases produced promising results, there is a general need for more effective and economical methods to prepare boride-containing materials.

DISCUSSION OF RELATED PATENT APPLICATIONS

Many of the above-discussed problems associated with the production of boride-containing materials have been addressed in U.S. Pat. No. 4,885,130 (hereinafter "Patent '130"), which issued on Dec. 5, 1989, in the names of T. Dennis Claar, Steven M. Mason, Kevin P. Pochiopien, Danny R. White and William B. Johnson and is entitled "Process for Preparing Self-Supporting Bodies and Products Made Thereby".

Briefly summarizing the disclosure of Patent '130, self-supporting ceramic bodies are produced by utilizing a parent metal infiltration and reaction process (i.e., reactive infiltration) in the presence of a mass comprising boron carbide. Particularly, a bed or mass comprising boron carbide and, optionally, one or more of a boron donor material and a carbon donor material, is infiltrated by molten parent metal, and the bed may be comprised entirely of boron carbide or only partially of boron carbide, thus resulting in a self-supporting body comprising, at least in part, one or more parent metal boron-containing compounds, which compounds include a parent metal boride or a parent metal boro carbide, or both, and typically also may include a parent metal carbide. It is also disclosed that the mass comprising boron carbide which is to be infiltrated may also contain one or more inert fillers mixed with the boron carbide. Accordingly, by combining an inert filler, the result will be a composite body having a matrix produced by the reactive infiltration of the parent metal, said matrix comprising at least one boron-containing compound, and the matrix may also include a parent metal carbide, the matrix embedding the inert filler. It is further noted that the final composite body product in either of the above-discussed embodiments (i.e., filler or no filler) may include a residual metal as at least one metallic constituent of the original parent metal.

Broadly, in the disclosed method of Patent '130, a mass comprising boron carbide and, optionally, one or more of a boron donor material and a carbon donor material, is placed adjacent to or in contact with a body of molten metal or metal alloy, which is melted in a substantially inert environment within a particular temperature envelope. The molten metal infiltrates the mass comprising boron carbide and reacts with at least the boron carbide to form at least one reaction product. The boron carbide (and/or the boron donor material and/or the carbon donor material) is reducible, at least in part, by the molten parent metal, thereby forming the parent metal boron-containing compound (e.g., a parent metal boride and/or boro compound under the temperature conditions of the process). Typically, a parent metal carbide is also produced, and in certain cases, a parent metal boro carbide is produced. At least a portion of the reaction product is maintained in contact with the metal, and molten metal is drawn or transported toward the unreacted mass comprising boron carbide by a wicking or a capillary action. This transported metal forms additional parent metal, boride, carbide, and/or boro carbide and the formation or development of a ceramic body is continued until either the parent metal or mass comprising boron carbide has been consumed, or until the reaction temperature is altered to be outside of the reaction temperature envelope. The resulting structure comprises one or more of a parent metal boride, a parent metal boro compound, a parent metal carbide, a metal (which, as discussed in Patent '130, is intended to include alloys and intermetallics), or voids, or any combination thereof. Moreover, these several phases may or may not be interconnected in one or more dimensions throughout the body. The final volume fractions of the boron-containing compounds (i.e., boride and boron compounds), carbon-containing compounds, and metallic phases, and the degree of interconnectivity, can be controlled by changing one or more conditions, such as the initial density of the mass comprising boron carbide, the relative amounts of boron carbide and parent metal, alloys of the parent metal, dilution of the boron carbide with a filler, the amount of boron donor material and/or carbon donor material mixed with the mass comprising boron carbide, temperature, and time. Preferably, conversion of the boron carbide to the parent metal boride, parent metal boro compound(s) and parent metal carbide is at least about 50%, and most preferably at least about 90%.

The typical environment or atmosphere which was utilized in Patent '130 was one which is relatively inert or unreactive under the process conditions. Particularly, it was disclosed that an argon gas, or a vacuum, for example, would be suitable process atmospheres. Still further, it was disclosed that when zirconium was used as the parent metal, the resulting composite comprised zirconium diboride, zirconium carbide, and residual zirconium metal. It was also disclosed that when aluminum parent metal was used with the process, the result was an aluminum boro carbide such as $Al_3B_{48}C_2$, $AlB_{12}C_2$ and/or $AlB_{24}C_4$, with aluminum parent metal and other unreacted unoxidized constituents of the parent metal remaining. Other parent metals which were disclosed as being suitable for use with the processing conditions included silicon, titanium, hafnium, lanthanum, iron, calcium, vanadium, niobium, magnesium, and beryllium.

Still further, it is disclosed that by adding a carbon donor material (e.g., graphite powder or carbon black) and/or a boron donor material (e.g., a boron powder, silicon borides, nickel borides and iron borides) to the mass comprising boron carbide, the ratio of parent metal-boride/parent metal-carbide can be adjusted. For example, if zirconium is used as the parent metal, the ratio of $ZrB_2/ZrC$ can be reduced if a carbon donor material is utilized (i.e., more ZrC is produced due to the addition of a carbon donor material in the mass of boron carbide) while if a boron donor material is utilized, the ratio of $ZrB_2/ZrC$ can be increased (i.e., more $ZrB_2$ is produced due to the addition of a boron donor material in the mass of boron carbide). Still further, the relative size of $ZrB_2$ platelets which are formed in the body may be larger than platelets that are formed by a similar process without the use of a boron donor material. Thus, the addition of a carbon donor material and/or a boron donor material may also effect the morphology of the resultant material.

In another related Patent, specifically, U.S. Pat. No. 4,915,736 (hereinafter referred to as "Patent '736"), issued in the names of Terry Dennis Claar and Gerhard Hans Schiroky, on Apr. 10, 1990, and entitled "A Method of Modifying Ceramic Composite Bodies By a Carburization Process and Articles Produced Thereby", additional modification techniques are disclosed. Specifically, Patent '736 discloses that a ceramic composite body made in accordance with the teachings of, for example, Patent '130 can be modified by exposing the composite to a gaseous carburizing species. Such a gaseous carburizing species can be produced by, for example, embedding the composite body in a graphitic bedding and reacting at least a portion of the graphitic bedding with moisture or oxygen in a controlled atmosphere furnace. However, the furnace atmosphere should comprise typically, primarily, a non-reactive gas such as argon. It is not clear whether impurities present in the argon gas supply the necessary $O_2$ for forming a carburizing species, or whether the argon gas merely serves as a vehicle which contains impurities generated by some type of volatilization of components in the graphitic bedding or in the composite body. In addition, a gaseous carburizing species could be introduced directly into a controlled atmosphere furnace during heating of the composite body.

Once the gaseous carburizing species has been introduced into the controlled atmosphere furnace, the setup should be designed in such a manner to permit the carburizing species to be able to contact at least a portion of the surface of the composite body buried in the loosely packed graphitic powder. It is believed that carbon in the carburizing species, or carbon from the graphitic bedding, will dissolve into the interconnected zirconium carbide phase, which can then transport the dissolved carbon throughout substantially all of the composite body, if desired, by a vacancy diffusion process. Moreover, Patent '736 discloses that by controlling the time, the exposure of the composite body to the carburizing species and/or the temperature at which the carburization process occurs, a carburized zone or layer can be formed on the surface of the composite body. Such process could result in a hard, wear-resistant surface surrounding a core of composite material having a higher metal content and higher fracture toughness.

Thus, if a composite body was formed having a residual parent metal phase in the amount of between about 5–30 volume percent, such composite body could be modified by a post-carburization treatment to result in from about 0 to about 2 volume percent, typically about ½ to about 2 volume percent, of parent metal remaining in the composite body.

U.S. Pat. No. 4,885,131 (hereinafter "Patent '131"), issued in the name of Marc S. Newkirk on Dec. 5, 1989, and entitled "Process For Preparing Self-Supporting Bodies and Products Produced Thereby", discloses additional reactive infiltration formation techniques. Specifically, Patent '131 discloses that self-supporting bodies can be produced by a reactive infiltration of a parent metal into a mixture of a bed or mass comprising a boron donor material and a carbon donor material. The relative amounts of reactants and process conditions may be altered or controlled to yield a body containing varying volume percents of ceramic, metals, ratios of one ceramic or another and porosity.

In another related patent application, specifically, copending U.S. patent application Ser. No. 07/762,163, filed on Sep. 19, 1991, which was a continuation of U.S. patent application Ser. No. 07/296,770 now abandoned, filed in the names of Terry Dennis Claar et al., and entitled "A Method of Producing Ceramic Composite Bodies", additional reactive infiltration formation techniques are disclosed. Specifically, application Ser. No. '770 discloses various techniques for shaping a bed or mass comprising boron carbide into a predetermined shape and thereafter reactively infiltrating the bed or mass comprising boron carbide to form a self-supporting body of a desired size and shape. Commonly Owned U.S. Pat. No. 5,011,063, issued on Apr. 30, 1991, from U.S. patent application Ser. No. 07/560,491, filed on Jul. 23, 1990, which was a Rule 62 Continuation of U.S. patent application Ser. No. 07/296,837 filed in the name of Terry Dennis Claar on Jan. 13, 1989, now abandoned, and entitled "A Method of Bonding A Ceramic Composite Body to a Second Body and Articles Produced Thereby", discloses various bonding techniques for bonding self-supporting bodies to second materials. Particularly, this patent application discloses that a bed or mass comprising one or more boron-containing compounds is reactively infiltrated by a molten parent metal to produce a self-supporting body. Moreover, residual or excess metal is permitted to remain bonded to the formed self-supporting body. The excess metal is utilized to form a bond between the formed self-supporting body and another body (e.g., a metal body or a ceramic body of any particular size or shape).

The reactive infiltration of a parent metal into a bed or mass comprising boron nitride is disclosed in copending U.S. Pat. No. 4,904,446 (hereinafter "Patent '446"), issued in the names of Danny Ray White et al., on Feb. 27, 1990, and entitled "Process for Preparing Self-Supporting Bodies and Products Made Thereby". Specifically, this patent discloses that a bed or mass comprising boron nitride can be reactively infiltrated by a parent metal. A relative amount of reactants and process conditions may be altered or controlled to yield a body containing varying volume percents of ceramic, metal and/or porosity. Additionally, the self-supporting body which results comprises a boron-containing compound, a nitrogen-containing compound and, optionally, a metal. Additionally, inert fillers may be included in the formed self-supporting body.

A further post-treatment process for modifying the properties of produced ceramic composite bodies is disclosed in U.S. patent application Ser. No. 07/296,966 (hereinafter "Application '966"), filed in the names of Terry Dennis Claar et al., on Jan. 13, 1989, now U.S. Pat. No. 5,004,714 and entitled "A Method of Modifying Ceramic Composite Bodies By Post-Treatment Process and Articles Produced Thereby". Specifically, U.S. Pat. No. 4,004,714 discloses that self-supporting bodies produced by a reactive infiltration technique can be post-treated by exposing the formed bodies to one or more metals and heating the exposed bodies to modify at least one property of the previously formed composite body. One specific example of a post-treatment modification step includes exposing a formed body to a siliconizing environment.

U.S. patent application Ser. No. 07/296,961 (now U.S. Pat. No. 4,019,539, which issued on May 28, 1991), filed in the names of Terry Dennis Claar et al., on Jan. 13, 1989, now U.S. Pat. No. 5,019,519, and entitled "A Process for Preparing Self-Supporting Bodies Having Contrølled Porosity and Graded Properties and Products Produced Thereby", discloses reacting a mixture of powdered parent metal with a bed or mass comprising boron carbide and, optionally, one or more inert fillers. Additionally, it is disclosed that both a powdered parent metal and a body or pool of molten parent metal can be induced to react with a bed or mass comprising boron carbide. The body which is produced is a body which has controlled or graded properties.

The disclosures of each of the above-discussed Commonly Owned U.S. Patent Applications and Patents are herein expressly incorporated by reference.

SUMMARY OF THE INVENTION

In accordance with the present invention, self-supporting ceramic bodies are produced utilizing a parent metal infiltration and reaction process (e.g., reactive infiltration) in the presence of a boron donor material and a carbon donor material. For example, a bed or mass of a boron donor material and a carbon donor material is infiltrated by molten parent metal result in a self-supporting body comprising one or more parent metal boron-containing compounds, which compounds include a parent metal boride or a parent metal boro carbide, or both, and typically also may include a parent metal carbide. Alternatively, the mass to be infiltrated may contain one or more inert fillers admixed with the boron donor material and carbon donor material to produce a composite by reactive infiltration, which composite may comprise a matrix of one or more boron-containing compounds and also may include a parent metal carbide. In both embodiments, the final product may include a metal phase as one or more metallic constituents of the parent metal.

The reactant concentrations and process conditions may be altered or controlled to yield a body containing varying volume percents of ceramic compounds, metal and/or porosity. Specifically, the amount of parent metal carbide relative to parent metal boride which is formed during reactive infiltration may be controlled by selecting specific starting amounts of boron donor material and carbon donor material. In some cases it may be desirable to supply a boron donor material (i.e., a boron-containing compounds) in an amount that is in excess of the stoichiometric ratio of $B_4C$ (i.e., greater than a molar ratio of 4 moles of boron to 1 mole of carbon), such boron donor material being capable of reacting with the parent metal to form a parent metal-boride phase, thereby modifying the resultant mechanical, physical, and thermal properties of the composite body relative to a body containing boron and carbon in a molar ratio of 4/1. Likewise, in some cases it may be desirable to supply a carbon donor material (i.e., a carbon-containing compound) in an amount that is in excess of the stroichiometric ratio of $B_4C$ (i.e., greater than a molar ratio of 1 mole of carbon to 4 moles of boron), such excess carbon donor material being capable of reacting with the parent metal to form a parent metal carbide phase, thereby modifying the resultant mechanical, physical, and thermal properties of the composite body. The reactant concentrations may be modified from an almost pure boron donor material to an almost pure carbon donor material depending upon the intended application for the final body. Specifically, the desired reactant concentration may be achieved by selecting the appropriate quantity of $B_4C$, C, and/or B (e.g., a preform comprising C and B powders). Moreover, the process conditions (e.g., time and temperature) may also be altered or controlled to yield a body containing varying volume percents of ceramic compounds, metal and/or porosity. For example, an increase in the dwell time or hold at the reaction temperature (e.g., 1900° C.) may permit the formation of a composite body possessing relatively larger $ZrB_2$ platelets. Thus, it is apparent that the amount of parent metal boride relative to parent metal carbide may be controlled to produce a variety of different materials for a wide variety of applications.

Moreover, in addition to the discussion of parent metals set forth above herein, it has been discovered that in some circumstances it may be desirable to utilize specific parent metal alloys to achieve a particular desirable result. For example, it has been discovered that a titanium/zirconium alloy produces very desirable self-supporting ceramic bodies by the above-described reactive infiltration process. Specifically, similar to that which was discussed above herein, a bed or mass comprising a boron donor material and a carbon donor material is infiltrated by a molten titanium/zirconium alloy. The particular advantages that are achieved by utilizing a titanium/zirconium alloy are that the resulting self-supporting body may have even better high temperature mechanical properties relative to a self-supporting body made with a parent metal comprising primarily zirconium. Accordingly, while either of the parent metals of titanium/zirconium may be used alone, certain advantages may be achieved when titanium is alloyed into zirconium or zirconium is alloyed into titanium in a range of from about substantially pure titanium to about substantially pure zirconium. When such a titanium/zirconium alloy reactively infiltrates a bed or mass comprising a boron donor material and a carbon donor material, the reaction products which are produced include titanium borides (e.g., $TiB_2$), zirconium borides (e.g., $ZrB_2$), titanium boro carbides and zirconium boro carbides, or a combination of the compounds, and typically may also contain titanium carbide and zirconium carbide. Still further, as discussed above, the mass to be infiltrated may contain one or more inert fillers admixed with the boron donor material and carbon donor material. In all of these embodiments, the final product may also include one or more metals, as one or more metallic constituents, of the titanium/zirconium alloy.

Broadly, in the method of this invention, a mass comprising a boron donor material and a carbon donor material, admixed in a desirable atomic or molar ratio (e.g., preferably in a molar ratio of B/C of from about 1/1 to about 10/1, but the admixture in some cases may approach a substantially pure boron donor material or a substantially pure carbon donor material) is placed adjacent to or contacted with a body of molten metal or metal alloy, which is melted in a substantially inert environment within a particular temperature envelope. The molten metal infiltrates the mass and reacts with each of the boron donor material and the carbon donor material to form one or more reaction products. The boron donor material is reducible, at least in part, by the molten parent metal to form the parent metal boron-containing compound (e.g. a parent metal boride and/or boro compound) under the temperature conditions of the process. Similarly, the carbon donor material is reducible, at least in part, by the molten metal to form at least one parent metal carbide phase. In certain cases a parent metal boro carbide may also be produced. At least a portion of the reaction product is maintained in contact with the metal, and molten metal is drawn or transported toward the unreacted mixture of boron donor material and carbon donor material by a wicking or capillary action. This transported metal forms additional parent metal boride, carbide, and/or boro carbide, and the formation or development of a ceramic body is continued until the parent metal or boron donor material and/or carbon donor material has been consumed, or until the reaction temperature is altered to be outside the reaction temperature envelope. The resulting structure comprises one or more of a parent metal boride, a parent metal boro compound, a parent metal carbide, a metal (which as used herein is intended to include residual parent metal, alloys, and intermetallics, etc.), or voids, or a combination thereof, and these several phases may or may not be interconnected in one or more dimensions. The final volume fractions of the boron- containing compounds (i.e. boride and boro compounds), carbon-containing compounds, and metallic phases, and the degree of interconnectivity, Can be controlled by changing one or more conditions, such as the initial density (e.g., of the preform) and relative amounts of boron donor material and carbon donor material, components of the parent metal, use of a filler, temperature and time (e.g., dwell or hold time at the reactive infiltration temperature). Still further, the above parameters can be controlled to produce a wide range of morphological changes in the formed body (e.g., tailoring the metal to ceramic ratio, the grain size of the reaction products, etc.).

Typically, the mass of boron donor material and carbon donor material will be at least somewhat porous so as to allow for wicking the parent metal through the reaction product. Wicking occurs apparently either because any volume change on reaction does not fully close off pores through which parent metal can continue to wick, or because the reaction product remains permeable to the molten metal due to such factors as surface energy considerations which render at least some of its grain boundaries permeable to the parent metal. The parent metal may not be reacted completely and a metallic phase may be present within the formed composite. The volume percent of the metallic phase can be tailored, for example, by adjusting the quantity of relative quantity of reactants within the permeable mass to form a composite possessing a unique combination of properties (e.g., high fracture toughness and wear resistance). Specifically, the present invention permits formation of a composite possesing properties ranging from characteristics dominated by a ceramic matrix through a metal matrix. Accordingly, the present invention permits fabrication of a tailored composite, which may possess a wide range of mechanical, physical and thermal properties.

In another embodiment, a composite is produced by the transport of molten parent metal into a bedding or mixture of boron donor material and carbon donor material, which have been admixed with one or more inert filler materials. In this embodiment, the mixture of boron donor material and carbon donor material is incorporated into or mixed with a suitable filler material, which then is placed adjacent to or in contact with the molten parent metal. This setup may be supported on or in a separate bed that is substantially non-wettable by and non-reactive with the molten metal under the process conditions. The molten parent metal infiltrates the boron donor material—carbon donor material—filler mixture and reacts with the boron donor material and carbon donor material to form one or more boron-containing compounds. The resulting self-supporting ceramic-metal composite typically is a dense microstructure which comprises a filler embedded by a matrix comprising boron-containing compound(s), and also may include a carbide and metal. Only a small amount of boron donor material and/or carbon donor material may be required to promote the reactive infiltration process. Thus, the resulting matrix can vary in content from one composed primary of metallic constituents thereby exhibiting certain properties characteristic of the parent metal (e.g., a metal matrix); to cases where a high concentration of the boron donor material and carbon donor material mixture is used in the process, thereby producing a significant boron-containing compound(s) or phase which, together with any carbon-containing compounds or phase, may dominate the properties of the body (e.g., a ceramic matrix). The filler may serve to enhance the properties of the composite, lower the raw materials cost of the composite, or moderate the kinetics of the boron-containing compound(s) and/or carbon-containing compound(s) formation reactions and the associated rate of heat evolution. Moreover, the filler can influence the type of compounds which are formed and influenced the molar ratios of the starting boron donor material and carbon donor material.

In a further embodiment, the material to be infiltrated is shaped into a preform corresponding to the geometry of the desired final composite. Subsequent reactive infiltration of the preform by the molten parent metal results in a composite having the net shape or near net shape of the preform, thereby minimizing expensive final machining and finishing operations. Moreover, to assist in reducing the amount of final machining and finishing operations, a barrier material can surround the preform. The use of a graphite mold is particularly useful as a barrier for such parent metals as zirconium, titanium, hafnium, etc., when used in combination with preforms made of, for example, boron carbide, boron nitride, boron and carbon. Still further, by placing an appropriate number of through-holes (e.g., venting means) having a particular size and shape in the aforementioned graphite mold, the amount of porosity which typically occurs within a composite body manufactured according to the present invention, is reduced. Typically, a plurality of holes can be placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform.

In a still further embodiment, the volume percentage of the metal present in the formed composite may be increased. Specifically, the relative amount of parent metal (e.g., zirconium) which is utilized to react a permeable mass can be increased or the quantity of the boron and/or carbon source may be decreased. For example, the volume percentage of the filler material can be increased and/or the volume percent of the reactants reduced. A formed composite possessing a greater volume percentage of metal may exhibit a greater fracture toughness. Further, an increased quantity of metal may permit bonding of the formed composite to another article, which may be different or similar chemically. Moreover, the ability to tailor the metal content of the formed composite permits formation of bodies possessing characteristics ranging from a ceramic matrix to a metal matrix composite.

DEFINITIONS

As used in this specification and the appended claims, the terms below are defined as follows:

"Parent metal" refers to that metal, e.g. zirconium, which is the precursor for the polycrystalline oxidation reaction product, that is, the parent metal boride or other parent metal boron compound, and includes that metal as a pure or relatively pure metal, a commercially available metal having impurities and/or alloying constituents therein, and an alloy in which that metal precursor is the major constituent; and when a specific metal is mentioned as the parent metal, e.g. zirconium, the metal identified should be read with this definition in mind unless indicated otherwise, by the context.

"Parent metal boride" and "parent metal boro compounds" mean a reaction product containing boron formed upon reaction between a boron donor material and the parent metal and includes a binary compound of boron with the parent metal as well as ternary or higher order compounds.

"Parent metal carbide" means a reaction product containing carbon formed upon reaction of a carbon donor material and the parent metal.

DETAILED DESCRIPTION OF THE INVENTION AND PREFERRED EMBODIMENTS

Figure 1:
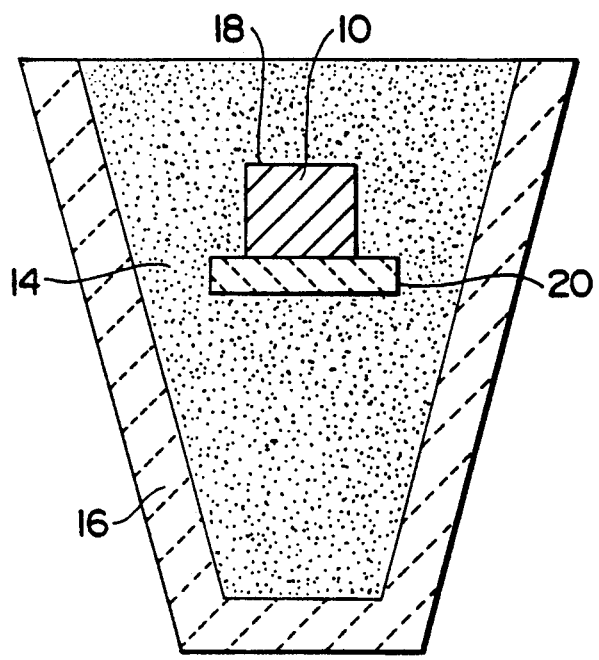
FIG. 1 is a schematic view in cross-section showing a parent metal ingot embedded in a particulate of a boron donor material and a carbon donor material within a refractory crucible, to be processed in accordance with the invention; p

In accordance with the invention, a self-supporting body is produced by the reactive infiltration of a molten parent metal with boron donor material and carbon donor material to form a polycrystalline ceramic-containing body comprising the reaction product(s) of the parent metal with boron donor material and carbon donor material, and also may include one or more constituents of the parent metal. The boron donor material and carbon donor material mixture is typically a solid at the process conditions, and is preferably in a fine particulate or powdered form. The environment or atmosphere for the process is chosen to be relatively inert or nonreactive under the process conditions. Argon or vacuum, for example, would be suitable process atmospheres. The resulting product comprises one or more of (a) a parent metal boride, (b) a boro compound, (c) a parent metal carbide, and (d) metal. The constituents and proportions of such constituents formed in the composite body depend largely on the choice and composition of parent metal, the compositions and molar ratio of the boron donor material and carbon donor material and the reaction conditions. Also, the self-supporting body produced may exhibit porosity or voids.

In the preferred embodiments of the present invention, the parent metal and a mass or bedding comprising the boron donor material and carbon donor material are positioned adjacent to each other so that reactive infiltration will be in the direction towards and into the bedding. The bedding, which may be preshaped (e.g., a preform or an assemblage of preforms which represents the geometry of the formed composite), may include a filler materialm such as a reinforcing filler, which is substantially inert under the process conditions. The reaction product may form throughout the bedding without substantially disturbing or displacing it. Thus, no external forces are required which might damage or disturb the arrangement of the bedding and no awkward or costly high temperature, high pressure processes and facilities are required to create the reaction product. Reactive infiltration of the parent metal into and with the boron donor material and carbon donor material, which preferably is in particulate or powdered form, forms a composite typically comprising a parent metal boride and a parent metal boro compound. With aluminum as the parent metal, the product may comprise an aluminum boro carbide (e.g. $Al_3B_{48}C_2$, $AlB_{12}C_2$, $AlB_{24}C_4$), and also may include metal, e.g. aluminum, and possibly other unreacted or unoxidized constituents of the parent metal. If zirconium is the parent metal, the resulting composite comprises zirconium boride and zirconium carbide. Also, zirconium metal may be present in the composite. Alternatively, if a titanium/zirconium alloy is used as the parent metal, the resulting composite comprises titanium boride, titanium carbide, zirconium boride and zirconium carbide. Additionally, some titanium/zirconium alloy may be present in the composite as residual or nonreacted parent metal.

Although the present invention is hereinafter described with particular reference to certain preferred embodiments in which the parent metal comprises zirconium or aluminum, this is for illustrative purposes only. Other parent metals and alloys thereof also may be used such as silicon, titanium, tantalum, hafnium, lanthanum, iron, calcium, vanadium, niobium, magnesium, chromium, beryllium, titanium/zirconium alloys, etc.

In another aspect of the invention, there is provided a self-supporting body, including composite bodies, comprising a matrix of reaction product, and, optionally metallic constituents, embedding a substantially inert filler. The matrix is formed by the reactive infiltration of a parent metal into a bed or mass of the filler intimately mixed with boron donor material and carbon donor material. The filler material may be of any size, shape or particle distribution, and may be oriented with respect to the parent metal in any manner as long as the direction of development of the reaction product will be towards and will engulf at least a portion of the filler material without substantially disturbing or displacing it. The filler may be composed of or comprise any suitable material, such as ceramic and/or metal fibers, whiskers, particulates, powders, rods, wires, wire cloth, refractory cloth, plates, platelets, reticulated foam structure, solid or hollow spheres, etc. A particularly useful filler is alumina, but other oxides and ceramic fillers may be used depending on the starting materials and the end properties desired. The volume of filler material may be a loose or bonded array or arrangement, which array has interstices, openings, intervening spaces, or the like, to render the filler material permeable to the infiltration of molten parent metal. Further the filler material may be homogeneous or heterogeneous. If desired, these materials may be bonded with any suitable binding agent (e.g. Avicil PH 105, from FMC Co.) which does not interfere with the reactions of this invention or leave any undesirable residual by-products within the final composite product. A filler which would tend to react excessively with the boron donor material and carbon donor material or with the molten metal during processing may be coated so as to render the filler inert to the process environment. For example, carbon fiber, if used as a filler in conjunction with aluminum as the parent metal, will tend to react with molten aluminum, but this reaction can be avoided if the fiber is first coated, e.g. with alumina.

A suitable refractory container holding the parent metal and a bed or volume of filler with admixed boron donor material and carbon donor material properly oriented to permit reactive infiltration of the parent metal into the filler bed and proper development of the composite, is placed in a furnace, and this lay-up is heated to a temperature above the melting point of the parent metal. At these elevated temperatures, the molten parent metal infiltrates the permeable filler by a wicking process and reacts with the boron donor material and carbon donor material, thereby producing the desired ceramic or ceramic-metal composite body. Moreover, to assist in reducing the amount of final machining and finishing operations, a barrier material can surround the preform. The use of a graphite mold is particularly useful as a barrier for such parent metals as zirconium, titanium, hafnium, etc., when used in combination with preforms made of, for example, boron carbide, boron nitride, boron and carbon. Still further, by placing an appropriate number of throughholes having a particular size and shape in the aforementioned graphite mold, the amount of porosity which typically occurs within a composite body manufactured according to the present invention, is reduced. Typically, a plurality of venting means or holes are placed in a bottom portion of the mold, or that portion of the mold toward which reactive infiltration occurs. The holes function as a venting means which permit the removal of, for example, argon gas which has been trapped in the preform as the parent metal reactive infiltration front infiltrates the preform.

A schematic for which can be utilized to fabricate a composite according to this invention is illustrated in FIG. 1. The boron donor material and carbon donor material, together with any desired inert filler materials, may be fabricated into a preform with a shape substantially corresponding to the desired geometry of the final composite. The preform 20 is superimposed with the parent metal precursor 10 and the assembly is surrounded by the inert material 14 contained within the crucible 16. The top surface 18 of the parent metal may or may not be exposed. The preform 20 may be prepared by any of a wide range of conventional ceramic body formation methods (such as uniaxial pressing, isostatic pressing, slip casting, sedimentation casting, tape casting, injection molding, filament winding for fibrous materials, etc.) depending on the characteristics of the filler. Initial bonding of the filler particles, whiskers, fibers, or the like, prior to reactive infiltration may be obtained through light sintering or by use of various organic or inorganic binder materials which do not interfere with the process or contribute undesirable by-products the finished material. The preform 20 is manufactured to have sufficient shape integrity and green strength, and should be permeable to the transport of molten metal, preferably having a porosity of between about 5 and 90% by volume and more preferably between about 25 and 75% by volume. In the case of an aluminum parent metal, suitable filler materials include, for example, silicon carbide, titanium diboride, alumina and aluminum dodecaboride (among others), and as particulates typically having a mesh size of from about 14 to 1000, but any admixture of filler materials and mesh sizes may be used. The preform 20 is then contacted with molten parent metal on at least a portion of at least one of its surface for a time sufficient to complete infiltration of the matrix to the surface boundaries of the preform. The result of this preform method is a ceramic-metal composite body of a shape closely or exactly representing that desired in the final product (e.g., net or near-net shaped), thus minimizing Or eliminating expensive final machining or grinding operations.

The infiltration of the permeable mass by the parent metal may be promoted by the presence of a boron donor material. A small amount of boron donor material has been shown to be effective, but the minimum can depend upon a number of factors such as type and particle size of the boron donor material, type of parent metal, type of material comprising the permeable mass, and process conditions (e.g., length of time or dwell at the reaction temperature). Thus, a wide variation of boron donor material concentrations can be provided in the filler, but the lower the concentration of boron donor material, the higher the volume percent of metal in the matrix. When very high amounts of a boron donor material are used, a composite may be produced which possesses a desirable fracture toughness (e.g., a composite comprising $ZrB_2$ and $Zr$). When very low amounts of the boron donor material are used, the resulting matrix may comprise interconnected metal and a limited amount of parent metal boride and parent metal carbide dispersed in the metal. In the absence of a boron donor material, reactive infiltration of the permeable mass may, in some combinations of materials, be undesirably slow, or not occur, and infiltration may not be possible without special procedures, such as the application of external pressure to force the metal into the permeable mass.

Because a wide range of boron donor material and carbon donor material concentrations in the permeable mass can be used in the process of this invention, it is possible to control or to modify the mechanical, physical, and thermal properties of the completed product by varying the concentration of boron donor material and carbon donor material and/or the composition of the bed and/or the ratio of boron donor material to carbon donor material, etc. When only a small amount of boron donor material and/or carbon donor material is present relative to the amount of parent metal, such that the mass comprises a low density of boron donor material and/or carbon donor material, the composite body or matrix properties are dominated by the properties of the parent metal, most typically ductility and toughness, because the matrix is predominantly metal (e.g., formation of a metal matrix composite). The metal matrix may comprise 0 through about 100 percent by volume of the formed composite and preferably 25 through 75 percent by volume. Such a product may be advantageous for low or mid-range temperature applications. When a large amount of boron donor material and carbon donor material is used, as for example particles being densely packed around a filler material or occupying a high percentage of space between constituents of the filler, the resulting body or matrix properties tend to be dominated by the parent metal boride and any parent metal carbide, in that the body or matrix would be harder or less ductile or less tough (e.g., formation of a ceramic matrix composite).

While not wishing to be bound by any particular theory, it is believed that the following equation may represent the formation of a ZBC body: $0.6 B_4C + (2.2+x)Zr_{(l)} \cdots 1.2 ZrB_2 + ZrC0.6 + xZr(l)$. If the stoichiometry is controlled closely so as to achieve substantially complete conversion of the parent metal, the resulting product will contain little or no metal, which may be advantageous for high temperature applications of the product. Further, the substantially complete conversion of the parent metal could be significant especially in some high temperature applications, because the boride reaction product is more stable than boron carbide in that boron carbide will tend to react with residual or unoxidized metal, e.g. zirconium, present in the product. Still further, the desired concentration of the reactants may be achieved by selecting the appropriate quantities of $B_4C$, C, and/or B (e.g., a preform comprising C and B powders). Moreover, the process conditions (e.g., time and temperature) may also be altered or controlled to yield a body containing varying volume percents of ceramic compounds, metal and/or porosity. For example, an increase in the dwell time or hold at the reaction temperature (e.g., 1900° C.) may permit the formation of a composite body possessing larger and homogeneously distributed $ZrB_2$ platelets. Thus, it is apparent that the amount of parent metal boride relative to parent metal carbide may be controlled to produce a variety of different materials possessing characteristics suitable for a wide range of applications.

In another embodiment, the volume percent of the metal present in the formed composite may be increased. Specifically, the relative amount of parent metal (e.g., zirconium) which is utilized to react with a permeable mass can be increased or the quantity of the boron and/or carbon source may be decreased. For example, the volume percentage of the filler material can be increased and/or the volume percent of the reactants reduced. A formed composite possessing a greater volume percentage of metal may exhibit a greater fracture toughness. Further, an increased quantity of metal may permit bonding of the formed composite to another article, which may be different or similar chemically. Moreover, &he ability to tailor the metal content of the formed composite permits formation of bodies possessing characteristic ranging from a ceramic matrix to a metal matrix composite.

Additional variations in the characteristics and properties of the composite can be created by controlling the infiltration conditions. Variables which can be manipulated include the nature and size of the particles of the boron donor material and/or carbon donor material, and the temperature and time of infiltration (e.g., dwell or hold at the reactive infiltration temperature). For example, reactive infiltration involving large particles of boron donor material and carbon donor material and minimum exposure times at low temperatures will result in a partial conversion of the boron donor material and/or carbon donor material to parent metal boron and parent metal carbon compound(s). Further, reactive infiltration at a relatively high temperature for a short period of time may also result in an incomplete or partial reaction. As a consequence, unreacted boron donor material and carbon donor material may remain in the microstructure, which may impart desirable properties to the finished material for some purposes. Infiltration involving the boron donor material and carbon donor material particles, high temperatures and prolonged exposure times (perhaps even to hold at reactive infiltration temperature after infiltration is complete) will tend to favor substantially complete conversion of the parent metal to the parent metal boride and carbon compound(s) and may be utilized to tailor the morphology of the formed composite body (e.g., increase the size of $ZrB_2$ platelets). For example, conversion of the boron donor material and carbon donor material to the parent metal boride, parent metal boro compound(s) and parent metal carbide is at least about 50%, and most preferably at least about 90%. Further, infiltration at high temperatures (or a subsequent high temperature treatment may temper or strengthen, for example, the metallic phase of a formed composite and/or may result in densification of some of the composite constituents by a sintering process. Particularly, the present invention may permit forming a ceramic matrix or metal matrix composite possessing a strengthened (e.g., precipitation hardened) metallic phase within the formed composite. In addition, the reduction of the amount of available parent metal below that which is necessary to form the boron and/or carbon compound(s) and fill the resulting interstices in the material may result in a porous body which also could have useful applications. In such a composite, porosity may vary from about 1 to 25 volume percent, and sometimes higher, depending upon the several factors or conditions enumerated above. Alternatively, an excess of parent metal or a deficiency of boron and/or carbon source (e.g., increased filler quantity) can be utilized to provide a formed composite having a relatively high volume percentage of metal (e.g., residual zirconium parent metal).

The following Examples illustrates the novel reaction products of this invention and the method by which they are prepared; however, these Examples are illustrative only and they are not intended to limit the invention claimed.

EXAMPLE 1

Figure 2:
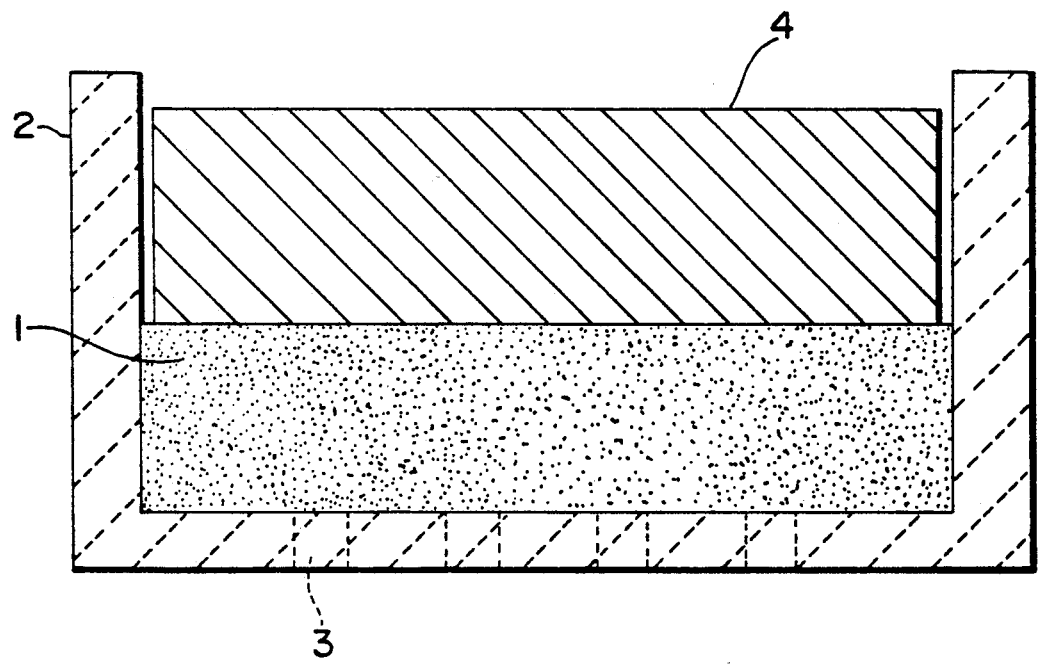
FIG. 2 is a schematic view in cross-section of the assembly used according to Example 1.

As shown in FIG. 2, a preform (1) comprising boron and carbon in a molar ratio of about 4:1 was prepared by mixing boron supplied by Consolidated Astronautics with Carbon black from Can Carb, sold under the trade name of UP-991, and with about 5 percent by weight Acrawax-C from Lonza, Inc. The boron, carbon black, and Acrawax were milled together. This mixture was dry pressed at a pressure of about 200 psi. The preform (1), measuring about 2 inches by 2 inches by about 0.275 inches in thickness, weighed about 26.77 grams and had a density of about 1.48 grams/centimeter$^3$.

A graphite crucible (2) measuring about 2 inches by 2 inches by 2 inches and comprised of 202-D grade graphite (from Stockpole Carbon Co.) was prepared by roughening with sand paper and by creating 16 approximately 1/16 inch diameter holes (3) placed in the bottom of the crucible. The above-described preform (1) was placed into the graphite crucible (2).

The graphite crucible (2) containing the preform (1) was placed into a retort furnace which was evacuated and backfilled with argon three times. The furnace was heated from room temperature up to about 250° C. in about 30 minutes. During heating, argon was passed through the retort furnace at a rate of 500 cc/minute. The temperature was increased from about 250° C. to about 550° C. at a rate of about 50° C./hour. This temperature was maintained for about 2 hours. The furnace was cooled to room temperature.

A 702 grade zirconium alloy (4) measuring about 2 inches by about 2 inches by 0.5 inches and weighing about 223 grams was placed directly upon the preform in the graphite crucible (2). The graphite crucible (2) containing the zirconium alloy (4) on the preform (1) was placed into an AVS furnace.

The AVS furnace was evacuated and backfilled with argon twice to ensure a pure argon atmosphere in the furnace. During the subsequent heating steps, argon was passed through the furnace at a rate of about 500 cc/minute, resulting in a pressure within the AVS furnace of about 1 psi. The temperature was increased from room temperature to about 1950° C. in about 6 hours. This temperature was maintained for about 2 then the furnace was permitted to cool to room temperature.

The graphite boat (2) was removed from the AVS furnace and inspected. It was discovered that the zirconium alloy (4) had reactively infiltrated into the preform (1) comprising carbon and boron to form a body comprising zirconium boride, and zirconium carbide, and zirconium metal.

Figure 3:
FIG. 3 is a photomicrograph taken at 400× magnification of a section of a body produced according to Example 1.

FIG. 3 is a photomicrograph taken at 400× of a section of the composite formed according to Example 1.

The following Examples 2 through 8 demonstrate the effects of variations in the reaction time at a constant temperature or dwell. Particularly, the following Examples will demonstrate that a longer dwell time at 1900° C. (e.g., a molten metal infiltration reaction temperature for zirconium) can be utilized to affect the microstructure (e.g., increase the size of the $ZrB_2$ platelets within the formed composite. Moreover, Examples 2 through 8 demonstrate that the present invention may be utilized to control the reaction between the preform and molten metal and, accordingly, tailor the mechanical, physical, and thermal properties of the formed composite.]

EXAMPLE 2

An about 2 inch square by about 0.57 inch thick preform was prepared by ball-milling a mixture comprising approximately 60% by weight of methylene chloride (from J. T. Baker Co.), 1% by weight of an organic binder (Dow Experimental Binder XUS 40303.0), and about 39% by weight $B_4C$ powder (1000 grit ESK) with alumina media in a NALGENE container. (Nalge Co., Rochester, N.Y.) The mixture was then stirred and sediment cast into an ATJ grade graphite, one piece construction, 2-inch square cross-section crucible with rounded corners, which had been presoaked with methylene chloride. The crucible with the mixture was dried until all the solvent visually disappears and then dried further in an oven at about 40° C. for about 4 hours to remove the remaining traces of solvent.

The crucible containing the preform was placed in a metal retort in a Lindberg resistance furnace which was then evacuated and backfilled with 99.999 % pure argon. The furnace was evacuated and backfilled a second time and the argon gas was left flowing at a rate of 2 liters/minute. The furnace was heated from room temperature to about 200° C. in 2 hours, held at 200° C. for one hour, heated from 200° C. to about 350° C. at 20° C. per hour, heated from 350° C. to about 600° C. at the rate of 100° C. per hour, held at about 600° C. for one hour and, subsequently, cooled to room temperature in 5 hours. The resulting preform had a density of about 1.21 $g/cm^3$ and a thickness of about 0.57 inches, and weighed about 44.69 grams.

A zirconium metal sponge weighing about 27 grams (from Consolidated Astronautics) was placed on top of the preform in the graphite crucible to comprise an assembly.

The assembly was placed in an Astro graphite resistance heated furnace which was evacuated and backfilled twice with 99.999% pure argon gas and left flowing at a rate of 2 liters/minute. The assembly was heated to about 1900° C. in 3 hours, held there for about 8 hours and then cooled to room temperature in one hour.

After removal of the assembly from the furnace, the excess $B_4C$ was removed from the sample by sandblasting. The sample showed nearly complete reactive infiltration with a small amount of unreacted $B_4C$ (approximately 5 grams) remaining on the bottom of the crucible.

The same example was run repeated using an about 1 inch circular cross-section sample instead of a 2 inch square cross-section sample. The preform was placed in a circular ATJ grade graphite crucible and processed in the same manner as the above-identified square sample. Before reactive infiltration, the circular preform had a density of about 1.46 $g/cm^3$, a thickness of 0.60 inches and a weight of about 11.28 grams. A zirconium metal sponge weighing about 68 grams was reacted with the preform to create a composite which also nearly completely reacted (e.g., approximately 2.3 grams unreacted $B_4C$ remaining on the bottom).

EXAMPLE 3

This example was conducted under substantially the same conditions as described above in Example 2 with the exception that the assembly was held in the furnace of the reactive infiltration temperature for about 4 hours instead of 8 hours. Specifically, a 2 inch square cross-section and sediment cast $B_4C$ preform was about 0.58 inches thick with a density of about 1.22 $g/cm^3$. The preform was reacted with about 278 grams of zirconium metal sponge in the square graphite crucible.

The same Example was repeated using a one inch circular sample that was about 0.66 inches thick, had a density of about 1.03 $g/cm^3$. The preform was reacted with about 53 grams of zirconium metal sponge in a round graphite crucible. Both samples showed nearly complete reactive infiltration with a thin layer of unreacted $B_4C$ on the bottom of the sample (e.g., weighing approximately 9 grams and approximately 2.1 grams for the square and circular parts, respectively.

EXAMPLE 4

An about 2 inch square cross-section by about 0.52 inch thick preform having a square cross-section was prepared by ball-milling a mixture comprising 60% by weight of methylene chloride (from J. T. Baker Co.), 1% by weight of an organic binder (Dow Experimental Binder XUS 40303.0), and about 39% by weight $B_4C$ powder (1000 grit ESK, Lot M10-B) with alumina media in a NALGENE container. The mixture was then stirred to obtain a high viscosity slip which was sediment cast into a graphite ATJ grade, one piece construction, about 2 inch square cross-section crucible with rounded corners, which had been presoaked with methylene chloride. The crucible with the mixture was dried until all the solvent visually disappears and then dried further in an oven at about 40° C. for 4 hours to remove the remaining traces of solvent.

The crucible with the mixture was placed in a metal retort in a Lindberg resistance heated furnace which was then evacuated and backfilled with 99.999% pure argon (supplied by Airco Products). The furnace was evacuated and backfilled a second time and the argon gas was left flowing at a rate of about 2 liters/minute. The furnace was heated from room temperature to about 200° C. in about 5 hours, held at 200° C. for about 2 hours, heated from about 200° C. to about 350° C. at about 20° C. per hour, heated in about 3 hours from 350°

C. to about 450° C. and, subsequently, cooled to room temperature in about 5 hours. The resulting preform had a density of about 1.22 g/cm$^3$, a thickness of 0.52 inches, and a weight of about 41.56 grams.

A zirconium metal sponge weighing about 252 grams Consolidated Astronautics was added to the crucible to form the complete assembly. The assembly was placed in a AVS vacuum graphite resistance heated furnace which Was evacuated and backfilled twice with 99.999% pure argon gas (supplied by Airco Products) which was left flowing at a rate of about 2 liters/minute. The assembly was heated to about 1900° C. over about 5 hours, held there for about 1 hour and then cooled to room temperature in one hour.

The sample was removed from the crucible and sandblasted to remove the excess B$_4$C. Upon inspection, it was discovered that the sample was not reacted fully.

EXAMPLE 5

An about 1 inch diameter circular cross-section by about 0.63 inch thick preform was prepared by ball-milling a mixture comprising 60% by weight of methylene chloride (from J. T. Baker Co.), 1% by weight of an organic binder (Dow Experimental Binder XUS 40303.0), and about 39% by weight B$_4$C powder (1000 grit ESK, Lot M10-B) with alumina media in a NALGENE container. The mixture was then stirred to get a high viscosity slip which was sediment cast into an ATJ grade graphite, one piece construction, about 1 inch diameter crucible presoaked with methylene chloride. The crucible with the mixture was then dried until all the solvent visually disappears and then dried further in an oven at about 40° C. for about 4 hours to remove the remaining traces of solvent.

The crucible with the mixture was placed in a metal retort in a Lindberg resistance heated furnace which was then evacuated and backfilled with 99.999% pure argon (supplied by Airco Products). The furnace was evacuated and backfilled a second time and the argon gas was left flowing at a rate of about 2 liters/minute. The furnace was heated from room temperature to about 200° C. in about 5 hours, held at about 200° C. for about 2 hours, heated from about 200° C. to about 350° C. at about 20° C. per hour, heated in about 3 hours from about 350° C. to about 450° C. and, subsequently, cooled to room temperature in about 5 hours. The resulting preform had a density of about 1.22 g/cm$^3$, a thickness of about 0.52 inches and weighed about 10 grams.

A zirconium metal sponge weighing about 58 grams from Consolidated Astronautics was added to the crucible to form the completed assembly. The assembly was placed in an AVS vacuum graphite resistance heated furnace which was evacuated and backfilled twice with 99.999% pure argon gas (supplied by Airco Products) which was left flowing at a rate of about 2 liters/minute. The assembly was heated to about 1900° C. over about 5 hours, held there for about 1 hour and then cooled to room temperature in one hour.

The sample was removed from the crucible and sandblasted to remove the excess B$_4$C. The sample showed nearly complete reaction of the B$_4$C and molten metal with only approximately 2.8 grams of unreacted B$_4$C on the bottom of the composite.

EXAMPLE 6

A preform was prepared by ball-milling a mixture comprising about 60% by weight of methylene chloride (from J. T. Baker), about 1% by weight of an organic binder (Dow Experimental Ceramic Binder XUS 40303.0), and about 39% by weight of powder B$_4$C (1000 grit, ESK Company, Lot M10-B) with alumina media in a NALGENE container. The solution sediment cast into a about 2 inch square ATJ grade graphite crucible with rounded corners.

The crucible with the mixture was placed in a metal retort in a Lindberg resistance furnace which was then evacuated and backfilled with 99.999% pure argon supplied by Airco Products. The furnace was evacuated and backfilled a second time and the argon gas was left flowing at a rate of about 2 liters/minute. The furnace was heated from room temperature to about 200° C. in 2 hours, held at 200° C. for one hour, heated from about 200° C. to about 350° C. at 20° C. per hour, heated from 350° C. to about 600° C. at the rate of 100° C. per hour and held at 600° C. for one hour. Subsequently, the preform was cooled to room temperature in about 5 hours resulting in a density of about 1.23 g/cm$^3$, a preform thickness of about 0.57 inches and a weight of about 46 grams. After the preform was formed, it was placed into a sealable container (e.g., dry box) for about 2 months. At the end of this period, the preform was inspected and dried at about 45° C. for one hour and then at 70° C. for 2 hours.

A zirconium metal sponge (Western Zirconium Co., Zr Sponge-Nuclear Grade) weighing about 276 grams was added to the crucible to form the complete assembly. The assembly was placed in a Astro graphite electric resistance heated furnace which was evacuated and backfilled twice with 99.999% pure argon gas (supplied by Airco Products) which was left flowing at a rate of about 2 liters/minute. The assembly was heated to about 1900° C. in about 3 hours, held there for about 0.5 hour and then cooled to room temperature in about one hour.

After removal of the assembly from the furnace, the sample was removed from the crucible and sandblasted to remove any excess unreacted B$_4$C. The sample generally showed incomplete reactive infiltration with approximately 26.9 grams of the B$_4$C being unreacted.

EXAMPLE 7

A preform was produced by ball-milling with alumina media about 60% by weight of methylene chloride (from J. T. Baker), about 1% by weight of an organic binder (Dow Experimental Ceramic Binder XUS 40303.0), and about 39% by weight of powder B$_4$C (1000 grit, ESK Company, Lot M9, dried at 110° C. for 18 hours) with alumina media in a NALGENE container. The solution was sediment cast into an about 1 inch diameter circular ATJ grade graphite crucible which had a about 1 inch diameter round AGSX grade graphite ring or extension added to the top added to position the zirconium metal sponge.

The crucible with the mixture was placed in a metal retort in a Lindberg resistance furnace which was then evacuated and backfilled with 99.999% pure argon (supplied by Airco Products). The furnace was evacuated and backfilled a second time and the argon gas was left flowing at a rate of about 2 liters/minute. The furnace was heated from room temperature to about 200° C. in 3 hours, held at 200° C. for one hour, heated from about 200° C. to about 350° C. at 20° C. per hour, heated in 2 hours from 350° C. to about 450° C. and, subsequently, cooled to room temperature in 1 hour. The resulting preform had a density of about 1.21 g/cm$^3$, a thickness of about 0.36 inches, and a weighed about 31 grams. The preform was kept in a sealable container as discussed above in Example 6.

A zirconium metal sponge weighing about 34 grams (Western Zirconium Co., Zr Sponge-Nuclear Grade) was added to the crucible to form the complete assembly. The assembly was placed in a Astro graphite resistance heated furnace which was evacuated and backfilled twice with 99.999% pure argon gas (supplied by Airco products) which was left flowing at a rate of about 2 liters/minute. The assembly was heated to about 1900° C. in 3 hours, held there for about 0.5 hour and then cooled to room temperautre in one hour.

After removal of the assembly from the furnace, the sample was removed from the crucible and sandblasted to remove any excess unreacted $B_4C$. The sample generally showed nearly complete reaction with only approximately 1.2 grams of $B_4C$ remaining unreacted.

EXAMPLE 8

This example was conducted under substantially the same conditions as described above in Example 2, with the exception being that the assembly was not held at 1900° C. for any appreciable length of time. Specifically, after a reactive infiltration temperature of about 1900° C. was achieved, the furnace was cooled to room temperature. The square cross-section and sediment cast $B_4C$ preform was about 0.61 inches thickn, hasd a density of 1.17 g/cm$^3$ and weighed about 46.4 gram. The preform was reacted with about 281 grams of zirconium metal sponge.

This procedure was repeated with a circular cross-section sediment cast $B_4C$ preform that was about 0.57 inches thick, had a density of about 1.22 g/cm$^3$ and weighed 9 grams. The preform was reacted with about 54 grams of zirconium metal sponge. Both samples showed incomplete reaction with reduced composite formation and large amounts of unreacted $B_4C$ (e.g., approximately 36 grams and approximately 6 grams of $B_4C$, respectively, for the square and circular parts. In view of the large quantity of unreacted $B_4C$, the reaction between the molten parent metal and $B_4C$ preform may be reduced by utilizing a shortened dwell or reaction time.

The following Examples 9 through 15 demonstrate the effects of utilizing differing ratios of boron and carbon in a preform which is to be reacted with molten metal. Specifically, the following Examples will demonstrate that the B to C ratio can be utilized to control the size (e.g., platelet size of $ZrB_2$) and composition of phases present in the formed composite.

EXAMPLE 9

An about 1 inch diameter by about 0.21 inch thick preform was prepared by hand mixing about 4.75 grams of a mixture comprising about 10 percent B (Atlantic Equip. Eng., crystalline structure, about 98–99%, 100 mesh powder) and about 90 atomic percent carbon powder (Lonza, Inc., type KS-6) with about 0.25 grams of Acrawax C (from Lonza Inc.). About 2 grams of this mixture was cold pressed at about 100 psi into an about 1 inch in diameter ATJ grade graphite crucible. The preform and crucible were then placed into a metal retort of a Lindberg electric resistance heated furnace. The furnace was evacuated and backfilled twice with about 99.999% pure argon gas (supplied by Airco Products). The furnace was then heated from about room temperature to about 250° C. in about 2 hours, from about 250° C. to about 300° C. in about one hour and to about 400° C. at a rate of about 10° C. per hour. Further heating to about 500° C. took about 2 hours. The furnace was held at about 500° C. for about one hour. The furnace was then cooled to room temperature in about one hour. The resultant preform had a weight of approximately 2 grams.

The preform and crucible were removed from the furnace and about 27 grams of zirconium metal sponge (Consolidated Astronautics) was placed on top of the preform to form the complete assembly. The assembly was placed into an AVS vacuum graphite resistance heated furnace which was evacuated and backfilled twice with about 99.999% pure argon gas. During the subsequent heating steps, the argon gas was passed through the furnace at a rate of about 2 liters/minute. The furnace was heated from room temperature to about 1750° C. in about 4 hours and held there for about one hour prior to further heating to about 1900° C. at a rate of about 150° C. per hour. The temperature was held at about 1900° C. for about 2 hours before the furnace was cooled to room temperature in about 5 hours.

After assembly was removed from the furnace, the resultant body was removed from the crucible and sandblasted to remove unreacted preform (approximately 0.8 grams). Inspection revealed that the zirconium metal had infiltrated and reacted with the preform to form large amounts of ZrC in a Zr matrix.

EXAMPLE 10

An about 1 inch diameter by about 0.33 inch thick preform was prepared by mixing about 4.75 grams of a mixture comprising about 25 atomic percent boron powder (Atlantic Equip. Eng., crystalline structure, about 98–99%, 100 mesh powder) and about 75 atomic percent carbon powder (Lonza, Inc., type KS-6) with about 0.25 grams of Acrawax C (from Lonza Inc.). About 2.98 grams of this mixture was pressed at approximately 100 psi into an about 1 inch in diameter ATJ grade graphite crucible. The preform and crucible were placed into a metal retort of a Lindberg electric resistance heated furnace. The furnace was evacuated and backfilled twice with about 99.999% pure argon gas (supplied by Airco Products). During the subsequent heating steps, argon was passed through the furnace at a rate of about 1000 cc/min. The furnace was heated from room temperature to about 250° C. in 2 hours, then from about 250° C. to about 300° C. at a rate of about 10° C. Further heating to about 500° C. took 2 hours. The furnace was held at about 500° C. for about one hour. The furnace was then cooled to about room temperature in one hour. The resulting preform had a weight of approximately 2.8 grams.

The preform and crucible were removed from the furnace and about 37 grams of zirconium metal sponge (Consolidated Astronautics) was placed on top of the preform to form the complete assembly. The assembly was placed into an AVS vacuum graphite electric resistance heated furnace which was then evacuated and backfilled twice with about 99.999% pure argon gas (supplied by Airco Products). During the subsequent heating steps, argon was passed through the furnace at a rate of about 2 liters/minute. The furnace was heated from room temperature to about 1750° C. in about 4 hours and held at about 1750° C. for about one hour prior to further heating to about 1900° C. in one hour. The temperature was held at about 1900° C. for about 2 hours before the furnace was cooled to room temperature in about 5 hours.

The assembly was removed from the furnace and the resultant body was removed from the crucible and sandblasted to remove a small amount of unreacted preform material (approximately 0.6 grams). Inspection revealed that the zirconium metal had infiltrated and reacted with the preform to form phases comprising $ZrC$ and $ZrB_2$ in a Zr matrix.

EXAMPLE 11

An about 1 inch in diameter by about 0 21 inch thick preform was prepared by mixing about 4.75 grams comprising a mixture of about 50 atomic percent boron powder (Atlantic Equip. Eng. crystalline structure, about 98-99%, 100 mesh powder) and about 50 atomic percent carbon powder (Lonza, Inc., type KS-6) with about 0.25 grams of Acrawax C (from Lonza Inc.). About 3.38 grams of this mixture was pressed at about 100 psi into an about 1 inch diameter ATJ grade graphite crucible. The preform and crucible were placed into a metal retort in a Lindberg electric resistance heated furnace. The furnace was evacuated and backfilled twice with about 99.999% pure argon gas (supplied by Airco Products). During the subsequent heating steps, argon was passed through the furnace at a rate of about 1000 cc/min. The furnace was heated from room temperature to about 250° C. in about 2 hours, from about 250° C. to about 300° C. in about one hour, and from about 300° C. to about 400° C. at a rate of about 10° C. per hour. The temperature was then increased from about 400° C. to about 500° C. in about 2 hours. The furnace was held at about 500° C. for about one hour before cooling to room temperature in about one hour. The resulting preform weighed about 3.20 grams.

The preform and crucible were removed from the furnace and about 35 grams of zirconium metal sponge (Consolidated Astronautics) was placed on top of the preform to form the complete assembly. The assembly was placed into an AVS vacuum graphite resistance heated furnace which was then evacuated and backfilled twice with about 99.999% pure argon gas (supplied by Airco Products). During the subsequent heating, argon was passed through the furnace at a rate of about 2 liters/minute. The furnace was heated from room temperature to about 1750° C. in about 4 hours and held there for about one hour. The temperature was then increased to about 900° C. in about one hour. The temperature was held at about 1900° C. for about 2 hours before the furnace was cooled to room temperature in about 5 hours.

After assembly was removed from the furnace, the sample was removed from the crucible and sandblasted to remove a small amount of unreacted preform material (approximately 0.27 grams). Inspection revealed that the zirconium metal had infiltrated and reacted with the preform to form phases comprising $ZrC$ and $ZrB_2$ in a Zr matrix.

EXAMPLE 12

An about 1 inch diameter by about 0.31 inch thick preform was made by mixing about 4.75 grams of a mixture comprising about 75 atomic percent boron powder (Atlantic Equip. Eng. crystalline structure, about 98-99% 100 mesh powder) and about 25 atomic percent carbon powder (Lonza, Inc., type KS-6) with about 0.25 grams of Acrawax C (from Lonza Inc.). The entire mixture was cold pressed at about 100 psi into an about 1 inch in diameter ATJ grade graphite crucible. The preform and crucible were placed into a metal retort of a Lindberg electric resistance heated furnace. The furnace was then evacuated and backfilled twice with about 99.999% pure argon gas (supplied by Airco Products). During the subsequent heating steps, argon was passed through the furnace at a rate of about 1000 cc/min. The furnace was heated from room temperature to about 250° C. in about 2 hours, from about 250° C. to about 300° C. in about one hour, and from about 300° C. to about 400° C. at a rate of about 10° C. per hour. Further heating to about 500° C. took about 2 hours. The furnace was held at about 500° C. for about one hour. The furnace was then cooled to room temperature in about one hour. The resulting preform had a weight of about 4.53 grams.

The preform and crucible were removed from the furnace and about 37 grams of zirconium metal sponge (Consolidated Astronautics) was placed on top of the preform to form the complete assembly. The assembly was placed into an AVS vacuum graphite electric resistance heated furnace which was then evacuated and backfilled twice with about 99.999% pure argon gas (supplied by Airco Products) During the subsequent heating steps, argon was passed through the furnace at a rate of about 2 liters/minute. The furnace was heated from room temperature to about 1750° C. in about 4 hours and held there for about one hour. The temperature was then increased to about 1900° C. in about one hour. The temperature was held at about 1900° C. for about 2 hours before the furnace was cooled to room temperature in about 5 hours.

The assembly was removed from the furnace and the resultant body was removed from the crucible and sandblasted to remove a small amount of unreacted material (approximately 0.27 grams). Inspection revealed that the zirconium metal had infiltrated and reacted with the preform to form phases comprising $ZrC$ and $ZrB_2$ in a Zr matrix.

EXAMPLE 13

An about 1 inch diameter by about 0.28 inch thick preform was made by mixing about 4.75 grams of a mixture comprising about 90 atomic percent boron powder (Atlantic Equip. Eng. crystalline structure, about 98-99%, 100 mesh powder) and about 10 atomic percent carbon powder (Lonza, Inc., type KS-6) with about 0.25 grams of Acrawax C (from Lonza-Inc.). The entire mixture was cold pressed at about 100 psi into an about 1 inch diameter ATJ grade graphite crucible. The preform and crucible were placed into a metal retort of a Lindberg electric resistance heated furnace. The furnace was then evacuated and backfilled twice with about 99.999% pure argon gas (supplied by Airco Products). During the subsequent heating steps, argon was passed through the furnace at a rate of about 1000 cc/min. The furnace was heated from room temperature to about 250° C. in about 2 hours, from about 250° C. to about 300° C. in about one hour and then from about 300° C. to about 400° C. at a rate of about 10° C. per hour. Further heating to about 500° C. took about 2 hours. The furnace was held at about 500° C. for about one hour. The furnace was then cooled to room temperature in about one hour. The resulting preform had a weight of about 4.63 grams.

The preform and crucible were removed from the furnace and about 30 grams of zirconium metal sponge (Consolidated Astronautics) was placed on top of the preform to form the complete assembly. The assembly was placed into an AVS vacuum graphite electric resistance heated furnace which was then evacuated and backfilled twice with about 99.999% pure argon gas (supplied by Airco Products). During the subsequent heating steps, argon was passed through the furnace at a rate of about 2 liters/minute. The furnace was heated from room temperature to about 1750° C. in about 4 hours and held at about 1750° C. for one hour. The temperature was then increased to about 1900° C. in about one hour. The temperature was held at about 1900° C. for about 2 hours before the furnace wa cooled to room temperature in about 5 hours.

The assembly was removed from the furnace and the resultant body was removed from the crucible and sandblasted to remove a small amount of unreacted preform material (approximately 0.31 grams). Inspection revealed that the zirconium metal had infiltrated and reacted with the preform to form phases comprising ZrC and $ZrB_2$ in a Zr matrix.

EXAMPLE 14

An about 1 inch diameter by about 0.155 inch thick preform was made by hand mixing about 9 grams of a mixture comprising about 25 atomic percent boron powder (Atlantic Equip. Eng. crystalline structure, about 98-99%, 100 mesh powder) and about 75 atomic percent carbon powder (Lonza, Inc., type KS-6) with about 50 grams of methylene chloride (J. T. Baker Co). A portion of this mixture was sediment cast and dried into an about 1 inch in diameter ATJ grade graphite crucible to form a preform which weighed approximately 3.82 grams. The crucible containing the preform was then placed into a metal retort of a Lindberg electric resistance heated furnace. The furnace was then evacuated and backfilled three times with 99.999% pure argon gas (supplied by Airco Products). During the subsequent heating steps, argon was passed through the furnace at a rate of about 1000 cc/min. The furnace was heated from room temperature to about 250° C. in about 5 hours, then from about 250° C. to about 300° C. in about one hour, and from about 300° C. to about 400° C. at a rate of about 10° C. per hour. The furnace was heated from about 400° C. to a final temperature of about 600° C. at a rate of about 50° C. per hour and held there for about one hour. The furnace was then cooled to room temperature in about 3 hours. The resulting preform had a weight of approximately 3.61 grams.

The preform and crucible were removed from the furnace and about 48 grams of zirconium metal sponge (Consolidated Astronautics) was placed on top of the preform to form the complete assembly. The assembly was placed into an AVS vacuum graphite electric resistance heated furnace which was then evacuated and backfilled twice with about 99.999% pure argon gas (supplied by Airco Products). During the subsequent heating steps, argon was passed through the furnace at a rate of about 2 liters/minute. The furnace was heated from room temperature to about 1750° C. in about 4 hours and held there for about one hour. The temperature was then increased to about 1900° C. in about one hour. The temperature was held at about 1900° C. for about 2 hours before the furnace was cooled to room temperature in about 5 hours.

The assembly was removed from the furnace and the resultant body was removed from the crucible and sandblasted to remove unreacted preform material (approximately 0.59 grams). Inspection revealed that the zirconium metal had infiltrated and reacted with the preform to form phases comprising ZrC, $ZrB_2$ and Zr metal.

EXAMPLE 15

An about 1 inch in diameter by about 0.31 inch thick preform was made by mixing about 9 grams of a mixture comprising about 50 atomic percent boron powder (Atlantic Equip. Eng. crystalline structure, about 98-99% 100 mesh powder) and 50 atomic percent carbon powder (Lonza, Inc., type KS-6) with about 50 grams of methylene chloride (J. T. Baker Co). Part of this mixture was sediment cast and dried into an about 1 inch in diameter ATJ grade graphite crucible to form a preform which weighed approximately 3.73 grams. The crucible containing the preform was then placed into a metal retort of a Lindberg electric resistance heated furnace. The furnace was then evacuated and backfilled three times with about 99.999% pure argon gas (supplied by Airco Products). During the subsequent heating steps, argon was passed through the furnace at a rate of about 1000 cc/min. The furnace was heated from room temperature to about 250° C. in about 5 hours, from about 250° C. to about 300° C. in about one hour, and from about 300° C. to about 400° C. at a rate of about 10° C. per hour. The furnace was heated from about 400° C. to a final temperature of about 600° C. at a rate of about 50° C. per hour and held at about 600° C. for about one hour. The furnace was then cooled to room temperature in about 3 hours. The resulting preform had a weight of approximately 3.54 grams.

The preform and crucible were removed from the furnace and about 38 grams of zirconium metal sponge (Consolidated Astronautics) was placed on top of the preform to form the complete assembly. The assembly was placed into an AVS vacuum graphite electric resistance heated furnace which was then evacuated and backfilled twice with about 99.999% pure argon gas (supplied by Airco Products). During the subsequent heating steps, argon was passed through the furnace at a rate of about 2 liters/minute. The furnace was heated from room temperature to about 1750° C. in about 4 hours and held at about 1750° C. for about one hour. The temperature was then increased to about 1900° C. in about one hour. The temperature was held at 1900° C. for about 2 hours and the furnace was cooled to room temperature in about 5 hours.

The assembly was removed from the furnace and the resultant body was removed from the crucible and sandblasted to remove a small amount of unreacted preform material (approximately 0.8 grams). Inspection revealed that the zirconium metal had infiltrated and reacted with the preform to form phases comprising ZrC, $ZrB_2$ and Zr metal.

Previous Examples 9-15 demonstrate that the present invention permits tailoring of the characteristics of the formed composite, e.g., the ceramic phase(s) present, the quantity of metal, etc. Accordingly, the present invention permits tailoring or engineering of the microstructure of the formed composite and the attendant properties (e.g., toughness) of the formed composite to meet the need or needs of a particular product.

The following Examples demonstrate the manner in which the present invention can be utilized to vary the metal content in a formed composite. Specifically, Examples 16 through 22 illustrate that the volume percentage of the quantity of metal in the formed composite may be increased.

EXAMPLE 16

Two about 2 inch square cross-section by approximately 0.5-0.6 inch thick preforms were fabricated by ball-milling with alumina media about 1% by weight of an organic binder (Dow Experimental Ceramic Binder XUS 40303.00, Lot 861230-2) into about 60% by weight of a solvent (methylene chloride from J. T. Baker Co.) in a NALGENE® container to form two solutions into which about 39% by weight of $B_4C$ (one solution from Fine Grade Union Carbide and one solution from 1000 grit, Lot M11-A, ESK Co.) which was shaken by hand for about 20-30 minutes. The solutions were sediment cast into dry about 2 inch square graphite crucibles with rounded corners (ATJ Grade Mold, one piece construction, from Graphite Engineering Co.) which were placed into a desiccating box overnight; air dried for one hour at room temperature; air dried further at about 40° C. for about 1 hour; and finally dried at about 70° C. for about 2 hours.

After drying, the crucibles housing two preforms were placed into a metal retort in a Lindberg electric resistance heated furnace which was evacuated and backfilled twice with 99.999% argon gas (supplied by Airco Products) which was left flowing at a rate of about 2 liters/minute. The furnace was heated from room temperature to about 200° C. in about 5 hours and then to about 450° C. at a rate of about 20° C. per hour. The furnace was further heated to about 600° C. in about 3 hours and then cooled to room temperature in about 8 hours.

Upon removal from the furnace, the preforms had densities and weights of about 1.4 g/cm$^3$ and approximately 50 grams and 1.5 g/cm$^3$ and approximately 50 grams, respectively, for the ESK $B_4C$ and Union Carbide $B_4C$. The preforms had approximately 300 grams of zirconium metal sponge (Western Zirconium Co., Nuclear Grade) placed on top of the preforms inside the crucibles to form the completed assembly.

The assembly was placed inside an AVS vacuum graphite resistance heated furnace which was evacuated and backfilled twice with 99.999% pure argon gas (supplied by Airco Products) which was left flowing at a rate of about 2 liters/minute giving the furnace a chamber pressure (gage) of about 2 psig. The furnace was heated from room temperature to about 1900° C. in 19 hours, held at that temperature for about 2 hours and then cooled to 1500° C. in 8 hours. Subsequent cooling to room temperature took 8 hours.

The assembly was removed from the furnace which allowed the composite to be removed from the crucible and sandblasted to remove unreacted preform (2-6 grams). Reactive infiltration took place providing a composite coupling ZrC, $ZrB_2$, and Zr metal.

EXAMPLE 17

An about 2 inch square cross-section by approximately 0.55 inch thick preform was made by ball-milling with alumina media about 1% by weight of an organic binder (Dow Experimental Ceramic Binder XUS 40303.00, Lot 861230-2) into about 60% by weight of a solvent (methylene chloride from J. T. Baker Co.) to form a solution into which about 39% by weight of $B_4C$ (1000 grit, Lot M11-A, ESK Co.) that was hand shaken in a NALGENE® container for 20-30 minutes. The solution was poured into a dry about 2 inch square graphite crucible with rounded corners (ATJ Grade Mold, one piece construction, from Graphite Engineering Co.) which was placed into a desiccating box overnight; air dried for one hour at room temperature; air dried further at about 40° C. for about 1 hour; and finally dried at about 70° C. for about 2 hours.

After drying, the preform and crucible were placed into a metal retort in a Lindberg electric resistance heated furnace which was evacuated and backfilled twice with 99.999% pure argon gas (supplied by Airco Products) which was left flowing at a rate of about 2 liters/minute. The furnace was heated from room temperature to about 200° C. in about 5 hours and then to about 450° C. at a rate of about 20° C. per hour. The furnace was further heated to about 600° C. in about 3 hours and then cooled to room temperature in 8 hours.

Upon removal from the furnace, the preform had a density of approximately 1.4 g/cm$^3$ and a weight of approximately 51.02 grams. Approximately 420 grams of zirconium metal sponge (Western Zirconium Co., Nuclear Grade, Lot 4448) was placed on top of the preform inside the crucible to form the completed assembly.

The assembly was placed inside an AVS vacuum graphite resistance heated furnace which was evacuated and backfilled twice with 99.999% pure argon gas (supplied by Airco Products) which was left flowing at a rate of about 2 liters/minute giving the furnace a chamber (gage) pressure of about 2 psig. The furnace was heated from room temperature to about 1900° C. in about 19 hours, held at that temperature for about 2 hours and then cooled to about 1500° C. in about 8 hours. Subsequent cooling to room temperature took about 8 hours.

The assembly was removed from the furnace which allowed the composite to be removed from the crucible and sandblasted to clean the surfaces. Reaction was complete (e.g., no unreacted portion after preform was visible) providing a composite comprising ZrC, $ZrB_2$, and Zr metal.

EXAMPLE 18

An about 2 inch square by approximately about 0.56 inch thick preform was made by ball-milling with alumina media about 1% by weight of an organic binder (Dow Experimental Ceramic Binder XUS 40303.00, Lot 861230-2) into about 60% by weight of a solvent (methylene chloride from J. T. Baker Co.)in a nalgene container to form a solution into which about 39% by weight of $B_4C$ (1000 grit, Lot M9-D, ESK Co.) was added and shaken for about 20-30 minutes. The solution was sediment cast into a dry about 2-inch square graphite crucible with rounded corners (ATJ Grade Mold, one piece construction, from Graphite Engineering Co.) which was placed into a desiccating box overnight; air dried for one hour at room temperature; air dried further at about 40° C. for about 1 hour; and finally dried at about 70° C. for about 2 hours.

After drying, the preform and crucible were placed into a metal retort in a Lindberg electric resistance heated furnace which was evacuated and backfilled twice with 99.999% pure argon gas (supplied by Airco Products) which was left flowing at a rate of about 2 liters/minute. The furnace was heated from room temperature to about 200° C. in about 5 hours and then to about 450° C. at a rate of about 20° C. per hour. The furnace was further heated to about 600° C. in 3 hours and then cooled to room temperature in 8 hours.

Upon removal from the furnace, the preform had a density of approximately 1.37 g/cm$^3$ and weighed approximately 50 grams. Approximately 500 grams of zirconium metal sponge (Western Zirconium Co., Nuclear Grade, Lot 4448) was placed on top of the preform inside the crucible to form the completed assembly.

The assembly was placed inside an AVS vacuum graphite resistance heated furnace which was evacuated and backfilled twice with 99.999% pure argon gas (supplied by Airco Products) which was left flowing at a rate of about 2 liters/minute giving the furnace a chamber pressure of about 2 psig. The furnace was heated from room temperature to about 1900° C. in about 19 hours, held at that temperature for about 2 hours and then cooled to about 1500° C. in about 8 hours. Subsequent cooling to room temperature took about 8 hours.

The assembly was removed from the furnace. The composite to be removed from the crucible and sandblasted to clean the surface. Reaction was complete with no unreacted preform providing a composite comprising ZrC, $ZrB_2$, and Zr metal.

EXAMPLE 19

An about 2 inch square cross-section by about 0.56 inch thick preform was made by ball-milling with alumina media about 1% by weight of an organic binder (Dow Experimental Ceramic Binder XUS 40303.00, Lot 861230-2) into about 60% by weight of a solvent (methylene chloride from J. T. Baker. Co.) in a NALGENE ® container to form a solution into which about 39% by weight of $B_4C$ (1000 grit, Lot M9-D, ESK Co.) was added and for about 20-30 minutes. The solution was sediment cast into a dry about 2-inch square graphite crucible with rounded corners (ATJ Grade Mold, one piece construction, from Graphite Engineering Co.) which was placed into a dry desiccating box overnight; air dried for one hour at room temperature; air dried further at about 40° C. for about 1 hour; and finally dried at about 70° C. for about 2 hours.

After drying, the preform and crucible were placed into a metal retort in a Lindberg resistance heated furnace which was evacuated and backfilled twice with 99.999% pure argon gas (supplied by Airco Products) which was left flowing at a rate of about 2 liters/minute. The furnace was heated from room temperature to about 200° C. in about 5 hours and then to about 450° C. at a rate of about 2° C. per hour. The furnace was further heated to about 600° C. in 3 hours and then cooled to room temperature in 8 hours.

Upon removal from the furnace, the preform had a density of approximately 1.40 g/cm$^3$ and weighed about 51.26 grams. About 640 grams of a zirconium metal sponge (Western Zirconium Co., Nuclear Grade, Lot 4448) was placed upon the crucible to form the completed assembly.

The assembly was placed inside a AVS vacuum graphite resistance heated furnace which was evacuated and backfilled twice with 99.999% pure argon gas (supplied by Airco Products) which was left flowing at a rate of about 2 liters/minute giving the furnace a chamber pressure of about 2 psig. The furnace was heated from room temperature to about 1900° C. in about 19 hours, held at that temperature for about 2 hours and then cooled to about 1500° C. in about 8 hours. Subsequent cooling to room temperature took about 8 hours.

The assembly was removed from the furnace which allowed the composite to be removed from the crucible and sandblasted to clean the surface. The reaction was substantially complete with essentially no unreacted preform providing a composite comprising ZrC, $ZrB_2$, and Zr metal.

EXAMPLE 20

An about 2 inch square by about 0.56 inch thick preform was made by ball-milling with alumina media about 1% by weight of an organic binder (Dow Experimental Ceramic Binder XUS 40303.00, Lot 861230-2) into about 60% by weight of a solvent (methylene chloride from J. T. Baker Co.) in a NALGENE container to form a solution into which 39% by weight of $B_4C$ (1000 grit, Lot M11-A, ESK Co.) was hand shaken for about 20-30 minutes. The solution was poured into a dry about 2-inch square graphite crucible with rounded corners (ATJ Grade Mold, one piece construction, from Graphite Engineering Co.) which was placed into a dry desiccating box overnight; air dried for one hour at room temperature; air dried further at about 40° C. for about 1 hour; and finally dried at about 70° C. for about 2 hours.

After drying, the preform and crucible were placed into a metal retort in a Lindberg resistance heated furnace which was evacuated and backfilled twice with 99.999% pure argon gas (supplied by Airco Products) which was left flowing at a rate of about 2 liters/minute. The furnace was heated from room temperature to about 200° C. in about 4 hours and then to about 350° C. at a rate of about 20° C. per hour. The furnace was further heated to about 600° C. in about 5 hours and then cooled to room temperature in about 9 hours.

Upon removal from the furnace, the preform had a density of approximately 1.37 g/cm$^3$ and a weight of 50.7 grams. About 634 grams of zirconium metal sponge (Western Zirconium Co., Nuclear Grade, Lot 4448) placed on top of it inside the crucible to form the complete assembly.

The assembly was placed inside a AVS vacuum graphite resistance heated furnace which was evacuated and backfilled twice with 99.999% pure argon gas (supplied by Airco Products) which was left flowing at a rate of about 2 liters/minute giving the furnace a chamber pressure of about 2 psig. The furnace was heated from room temperature to about 1900° C. in about 19 hours, held at that temperature for about 2 hours and then cooled to about 1500° C. in about 8 hours. Subsequent cooling to room temperature took about 8 hours.

The assembly was removed from the furnace which allowed the composite to be removed from the crucible and sandblasted to clean the surfaces. The reactive infiltration was complete with no substantially unreacted $B_4C$ providing a composite comprising ZrC, $ZrB_2$, and Zr metal.

EXAMPLE 21

An about 2 inch square cross-section by approximately about 0.54 inch thick preform was made by ball-milling with alumina media about 1% by weight of an organic binder (Dow Experimental Ceramic Binder XUS 40303.00, Lot 861230-2) into about 60% by weight of a solvent (methylene chloride from J. T. Baker Co.) in a nalgene container to form a solution into which about 39% by weight of $B_4C$ (1000 grit, Lot M11-A, ESK Co.) was hand shaken for about 20-30 minutes. The solution was poured into a dry about 2-inch square graphite crucible with rounded corners (ATJ Grade Mold, one piece construction, from Graphite Engineering Co.) which was placed into a dry desiccating box overnight; air dried for one hour at room temperature;

air dried further at about 40° C. for about 1 hour; and finally dried at about 70° C. for about 2 hours.

After drying, the preform and crucible were placed into a metal retort in a Lindberg resistance heated furnace which was evacuated and backfilled twice with 99.999% pure argon gas (supplied by Airco Products) which was left flowing at a rate of about 2 liters/minute. The furnace was heated from room temperature to about 200° C. in about 4 hours and then to about 350° C. at a rate of about 20° C. per hour. The furnace was further heated to about 600° C. in about 5 hours and then cooled to room temperature in about 9 hours.

Upon removal from the furnace, the preform had a density of approximately 1.40 g/cm$^3$ and a weight of approximately 49 grams. Approximately 825 grams of zirconium metal sponge (Western Zirconium Co., Nuclear Grade, Lot 4448) placed on top of it inside the crucible to form the complete assembly. The B$_4$C to metal ratio was about 0.060.

The assembly was placed inside a AVS vacuum graphite resistance heated furnace which was evacuated and backfilled twice with 99.999% pure argon gas (supplied by Airco Products) which was left flowing at a rate of about 2 liters/minute giving the furnace a chamber (gage) pressure of 2 psig. The furnace was heated from room temperature to a 190° C. in about 19 hours, held at that temperature for about 2 hours and then cooled to about 1500° C. in about 8 hours. Subsequent cooling to room temperature took about 8 hours.

The assembly was removed from the furnace which allowed the composite to be removed from the crucible and sandblasted to clean the surface. The reactive infiltration was complete with no unreacted preform providing a composite comprising ZrC, ZrB$_2$, and Zr metal.

EXAMPLE 22

An 2-inch square cross-section by approximately about 0.54 inch thick preform was made by ball-milling with alumina media a about 1% by weight of an organic binder (Dow Experimental Ceramic Binder XUS 40303.00, Lot 861230-2) into about 60% by weight of a solvent (methylene chloride from J. T. Baker Co.) in a nalgene container to form a solution into which about 39% by weight of B$_4$C (1000 grit, Lot M11-A, ESK Co.) was hand shaken for about 20–30 minutes. The solution was poured into a dry about 2-inch square graphite crucible with rounded corners (ATJ Grade Mold, one piece construction, from Graphite Engineering Co.) which was placed into a dry desiccating box overnight; air dried for one hour at room temperature; air dried further at about 40° C. for about 1 hour; and finally dried at about 70° C. for about 2 hours.

After drying the preform and crucible were placed into a metal retort in a Lindberg resistance heated furnace which was evacuated and backfilled twice with 99.999% pure argon gas (supplied by Airco Products) which was left flowing at a rate of about 2 liters/minute. The furnace was heated from room temperature to about 200° C. in about 4 hours and then to about 350° C. at a rate of about 20° C. per hour. The furnace was further heated to about 600° C. in about 5 hours and then cooled to room temperature in about 9 hours.

Upon removal from the furnace, the preform had a density of approximately 1.40 g/cm$^3$ and a weight of approximately 49 grams. Approximately 1235 grams of zirconium metal sponge (Western Zirconium Co., Nuclear Grade, Lot 4448) placed on top of it inside the crucible to form the complete assembly. The B$_4$C to metal ratio was about 0.040.

The assembly was placed inside a AVS vacuum graphite resistance heated furnace which was evacuated and backfilled twice with 99.999% pure argon gas (supplied by Airco Products) which was left flowing at a rate of about 2 liters/minute giving the furnace a chamber pressure of about 2 psig. The furnace was heated from room temperature to about 1900° C. in 19 hours, held at that temperature for about 2 hours and then cooled to about 1500° C. in about 8 hours. Subsequent cooling to room temperature took about 8 hours.

The assembly was removed from the furnace which allowed the composite to be removed from the crucible and sandblasted to clean the surfaces. Complete reaction occurred with no unreacted preform providing a composite comprising ZrC, ZrB$_2$, and Zr metal.

Examples 16 through 22 demonstrate that the present invention may form composite bodies possessing a wide range of volume percent metal (e.g., zirconium) The volume percent of metal present can be utilized to provide the particular mechanical, physical and thermal properties desired. Particularly, an increased quantity of zirconium metal within the formed composite may provide an increased fracture toughness.

While the present invention has been disclosed in its preferred embodiments, it is to be understood that the invention is not limited to the precise disclosure contained herein, but may otherwise be embodied in various changes, modifications, and improvements which may occur to those skilled in the art, without departing from the scope of the invention, as defined in the appended claims.

What is claimed is:

1. A method for producing a self-supporting body, comprising:
   selecting a parent metal;
   heating said parent metal in a substantially inert atmosphere to a temperature above the melting point of said parent metal to form a body of molten parent metal;
   contacting said body of molten parent metal with a permeable mass comprising at least one boron donor material and at least one carbon donor material, wherein the quantity of parent metal provided is in excess of the amount required to completely react with said permeable mass;
   maintaining said temperature for a time sufficient to permit infiltration of said molten parent metal into said permeable mass and to permit reaction of said molten parent metal with said permeable mass;
   continuing said infiltration and reaction for a time sufficient to produce said self-supporting body comprising at least one parent metal boron-containing compound and at least one metallic phase comprising residual unreacted parent metal; and
   subjecting said self-supporting body to a high temperature treatment, such that said high temperature treatment results in at least one of precipitation hardening and tempering of said metallic phase within said self-supporting body.

2. The method according to claim 1, wherein said parent metal comprises at least one metal selected from the group consisting of silicon, titanium, zirconium, hafnium, vanadium, lanthanum, iron, calcium, magnesium, beryllium, chromium, aluminum, niobium, and tantalum.

3. The method according to claim 1, wherein said parent metal comprises titanium/zirconium alloy.

4. The method of claim 1, further comprising shaping said permeable mass into a self-supporting preform.

5. The method of claim 1, wherein said self-supporting body comprises a metal matrix composite.

6. The method of claim 1, wherein said self-supporting body comprises a ceramic matrix composite.

7. The method of claim 1, wherein said parent metal comprises at least one metal selected from the group consisting of titanium, zirconium and hafnium.

8. The method of claim 1, wherein said parent metal comprises zirconium.

9. The method of claim 1, wherein said infiltration and reaction is conducted for a sufficiently short period of time as to result in said self-supporting body comprising at least one of unreacted boron donor material and unreacted carbon donor material.

10. The method of claim 1 wherein said permeable mass further comprises a reinforcing filler.

11. The method of claim 10, wherein the shape of said filler material comprises a shape selected from the group consisting of fibers, whiskers, particulates, powders, rods, wire, wire cloth, refractory cloth, plates, platelets, reticulated foam structure, solid spheres and hollow spheres.

12. The method of claim 1, wherein said high temperature treatment further results in densification of said body by a sintering process.

13. The method of claim 1, wherein the molar ratio of boron donor material to carbon donor material in said permeable mass may vary from predominantly pure boron donor material to predominantly pure carbon donor material.

14. The method of claim 1, wherein said self-supporting body comprises at least some porosity.

15. The method of claim 1, wherein substantially all of said boron donor material and said carbon donor material reacts with said molten parent metal infiltrating said permeable mass.

16. The method of claim 1, wherein said self-supporting body comprises at least some unreacted boron donor material or carbon donor material.

17. The method of claim 10, wherein said reinforcing filler comprises a coating thereon, thereby causing said filler to be substantially inert.

18. The method of claim 1, wherein said maintaining of said temperature to permit infiltration of said molten parent metal into said permeable mass and reaction of said molten parent metal with said permeable mass is conducted so as to induce further formation of an increased grain size within said self-supporting body.

19. The method of claim 1, wherein said permeable mass is shaped into a self-supporting preform having a geometry corresponding to the geometry of the desired self-supporting body.

20. The method of claim 19, wherein said geometry results from an assemblage of preforms.

21. The method of claim 19, further comprising a barrier material surrounding at least a portion of said preform.

22. The method of claim 21, wherein said barrier material comprises graphite.

23. The method of claim 1, wherein said permeable mass consists essentially of at least one boron donor material and at least one carbon donor material.

24. The method of claim 1, wherein said permeable mass consists essentially of at least one boron donor material, at least one carbon donor material and a filler.

* * * * *